US011593957B2

(12) United States Patent
Fu et al.

(10) Patent No.: US 11,593,957 B2
(45) Date of Patent: Feb. 28, 2023

(54) NETWORK AND SYSTEM FOR POSE AND SIZE ESTIMATION

(71) Applicant: Fudan University, Shanghai (CN)

(72) Inventors: Yanwei Fu, Shanghai (CN); Haitao Lin, Shanghai (CN); Xiangyang Xue, Shanghai (CN)

(73) Assignee: Fudan University, Shanghai (CN)

( * ) Notice: Subject to any disclaimer, the term of this patent is extended or adjusted under 35 U.S.C. 154(b) by 0 days.

(21) Appl. No.: 17/691,728

(22) Filed: Mar. 10, 2022

(65) Prior Publication Data
US 2022/0292698 A1     Sep. 15, 2022

(51) Int. Cl.
*G06T 7/50*     (2017.01)
*G06T 7/73*     (2017.01)
*G06T 17/00*    (2006.01)

(52) U.S. Cl.
CPC ............. *G06T 7/50* (2017.01); *G06T 7/75* (2017.01); *G06T 17/00* (2013.01); *G06T 2200/08* (2013.01); *G06T 2207/20081* (2013.01)

(58) Field of Classification Search
CPC ............. G06N 3/04–049; G06N 3/08–088
See application file for complete search history.

(56) References Cited

U.S. PATENT DOCUMENTS

| 2019/0287283 | A1  | 9/2019 | Lin |
| 2021/0125313 | A1  | 4/2021 | Bai |
| 2021/0209797 | A1* | 7/2021 | Lee ..................... G06T 17/00 |

FOREIGN PATENT DOCUMENTS

WO    WO2020038207    2/2020

OTHER PUBLICATIONS

Chen, Dengsheng, et al. "Learning canonical shape space for category-level 6d object pose and size estimation." Proceedings of the IEEE/CVF conference on computer vision and pattern recognition. 2020. (Year: 2020).*
Manhardt, Fabian, et al. "CPS++: Improving class-level 6D pose and shape estimation from monocular images with self-supervised learning." arXiv preprint arXiv:2003.05848 (2020). (Year: 2020).*

(Continued)

*Primary Examiner* — Ryan McCulley
(74) *Attorney, Agent, or Firm* — Brad Bertoglio; Intelink Law Group, P.C.

(57) ABSTRACT

A network for category-level 6D pose and size estimation, including a 3D-OCR module for 3D Orientation-Consistent Representation, a GeoReS module for Geometry-constrained Reflection Symmetry, and a MPDE module for Mirror-Paired Dimensional Estimation; wherein the 3D-OCR module and the GeoReS module are incorporated in parallel; the 3D-OCR module receives a canonical template shape including canonical category-specific keypoints; the GeoReS module receives an original input depth observation including pre-processed predicted category labels and potential masks of the target instances; the MPDE module receives the output from the GeoReS module as well as the (Continued)

original input depth observation; and the network outputs the estimation results based on the output of the MPDE module, the output of the 3D-OCR module, as well as the canonical template shape. Also provided are corresponding systems and methods.

15 Claims, 2 Drawing Sheets

(56) References Cited

OTHER PUBLICATIONS

Tian, Meng, Marcelo H. Ang, and Gim Hee Lee. "Shape prior deformation for categorical 6d object pose and size estimation." European Conference on Computer Vision. Springer, Cham, 2020. (Year: 2020).*
Wang, He, et al. "Normalized object coordinate space for category-level 6d object pose and size estimation." Proceedings of the IEEE/CVF Conference on Computer Vision and Pattern Recognition. 2019. (Year: 2019).*
Wang, Gu, et al. "Self6d: Self-supervised monocular 6d object pose estimation." European Conference on Computer Vision. Springer, Cham, 2020. (Year: 2020).*
Hang Shao, Yongxiong Wang, Yinghua Fu, Zhong Yin; Signal Processing: Image Communication; El Sevier; 2020 Elsevier B.V.; pp. 1-9.
Zhe Cao, Yaser Sheikh, Natasha Kholgade Banerjee; Real-time scalable 6DOF pose estimation for textureless objects; 2016 IEEE International Conference on Robotics and Automation (ICRA) Stockholm, Sweden, May 16-21, 2016; pp. 2441-2448.
Chang et al.; ShapeNet: An Information-Rich 3D Model Repository; http://www.shapenet.org; arXiv:1512.03012v1 [cs.GR] Dec. 9, 2015; pp. 1-11.
Christopher Funk et al.; 2017 ICCV Challenge: Detecting Symmetry in the Wild; 2017 IEEE International Conference on Computer Vision Workshops; IEEE DOI 10.1109/ICCVW.2017.198; pp. 1692-1701.
Kaiming He, Georgia Gkioxari, Piotr Dollar, Ross Girshick; Mask R-CNN; Computer Vision Foundation; pp. 2961-2969.
Yisheng He et al.; PVN3D: A Deep Point-wise 3D Keypoints Voting Network for 6DoF Pose Estimation; 2020 Computer Vision Foundation; pp. 11632-11641.
Stefan Hinterstoisser et al.; Model Based Training, Detection and Pose Estimation of Texture-Less 3D Objects in Heavily Cluttered Scenes; pp. 1-14.
Zitian Huang, Yikuan Yu, Jiawen Xu, Feng Ni, Xinyi Le; PF-Net: Point Fractal Network for 3D Point Cloud Completion; 2020 Computer Vision Foundation; pp. 7662-7670.
Jarmo Ilonen, Jeannette Bohg, Ville Kyrki; Three-dimensional object reconstruction of symmetric objects by fusing visual and tactile sensing; The International Journal of Robotics Research; 2014 33: 321 originally published online Oct. 1, 2013; DOI: 10.1177/0278364913497816; Published by: SAGE; http://www.sagepublications.com; pp. 321-344.
Alex Kendall et al.; PoseNet: A Convolutional Network for Real-Time 6-DOF Camera Relocalization; 2015 IEEE International Conference on Computer Vision; DOI 10.1109/ICCV.2015.336; pp. 2938-2946.
Nilesh Kulkarni et al; Canonical Surface Mapping via Geometric Cycle Consistency; 1907.10043v2 [cs.CV] Aug. 15, 2019; pp. 16.
Vincent Lepetit et al.; EPnP: An Accurate O(n) Solution to the PnP Problem; Int J Comput Vis DOI 10.1007/s11263-008-0152-6; Springer Science+Business Media, LLC 2008; pp. 12.
Yan Li, Leon Gu, Takeo Kanade; Robustly Aligning a Shape Model and Its Application to Car Alignment of Unknown Pose; IEEE Transactions on Pattern Analysis and Machine Intelligence, vol. 33, No. 9, Sep. 2011, pp. 1860-1876.
David G. Lowe; Object Recognition from Local Scale-Invariant Features; IEEE Xplore; pp. 8.
Rajendra Nagar, Shanmuganathan Raman; Reflection Symmetry Axes Detection Using Multiple Model Fitting; IEEE Signal Processing Letters, vol. 24, No. 10, Oct. 2017; pp. 1438-1442.
Sida Peng et al.; PVNet: Pixel-wise Voting Network for 6DoF Pose Estimation; Computer Vision Foundation; pp. 4561-4570.
Charles R. Qi et al.; Deep Hough Voting for 3D Object Detection in Point Clouds; Computer Vision Foundation; pp. 9277-9286.
Caner Sahin et al.; Instance- and Category-level 6D Object Pose Estimation; arXiv:1903.04229v1 [cs.CV] Mar. 11, 2019. pp. 1-23.
Caner Sahin et al.; A Review on Object Pose Recovery: from 3D Bounding Box Detectors to Full 6D Pose Estimators; Electrical and Electronic Engineering Department, Imperial Computer Vision and Learning Lab (ICVL), Imperial College London, SW72AZ, UK; pp. 1-25.
Caner Sahin et al.; Category-level 6D Object Pose Recovery in Depth Images; arXiv:1808.00255v1 [cs.CV] Aug. 1, 2018; pp. 1-16.
Peter H. Schonemann; A Generalized Solution of the Orthogonal Procrustes Problem; Psychometrika—vol. 31, No. 1, Mar. 1966; pp. 1-10.
Chen Song et al.; HybridPose: 6D Object Pose Estimation under Hybrid Representations; arXiv: 2001.01869v4 [cs.CV] Oct. 16, 2020; pp. 17.
Chen Wang et al.; 6-PACK: Category-level 6D Pose Tracker with Anchor-Based Keypoints; 2020 IEEE International Conference on Robotics and Automation (ICRA) May 31-Aug. 31, 2020. Paris, France; pp. 10059-10066.
Chen Wang et al.; DenseFusion: 6D Object Pose Estimation by Iterative Dense Fusion; Computer Vision Foundation; pp. 3343-3352.
Zhaozhong Wang et al.; Reflection Symmetry Detection Using Locally Affine Invariant Edge Correspondence; IEEE Transactions on Image Processing, vol. 24, No. 4, Apr. 2015; pp. 1297-1301.
Shangzhe Wu et al.; Unsupervised Learning of Probably Symmetric Deformable 3D Objects from Images in the Wild; 2020 Computer Vision Foundation; pp. 1-10.
Yu Xiang et al.; PoseCNN: A Convolutional Neural Network for 6D Object Pose Estimation in Cluttered Scenes; arXiv:1711 00199V3 [cs.CV] May 26, 2018; pp. 10.
Tianfan Xue et al.; Symmetric Piecewise Planar Object Reconstruction from a Single Image; IEEE Xplore; pp. 2577-2584.
C. Barner, E. Shechtman, A. Finkelstein, D. Goldman; PatchMatch: A Randomized Correspondence Algorithm for Structural Image Editing. ACM Trans. Graph. 28, 3, Article 24 (Aug. 2009), 11 pages; DOI = 10.1145/1531326.1531330 http://doi.acm.org/10.1145/1531326.1531330.
A. Criminisi, P. Perez, K. Toyama; Object Removal by Exemplar-Based Inpainting; Proceedings of the 2003 IEEE Computer Society Conference on Computer Vision and Pattern Recognition (CVPR'03); pp. 1-8.
Y. Cui, M. Jia, T. Lin, Y. Song, S. Belongie; Class-Balanced Loss Based on Effective Number of Samples; Computer Vision Foundation; pp. 9268-9277.
P. Denis, J. H. Elder, and F. J. Estrada; Efficient Edge-Based Methods for Estimating Manhattan Frames in Urban Imagery; ECCV 2008, Part II, LNCS 5303, pp. 197-210, 2008.
L. Ding, A. Goshtasby; On the Canny edge detector; Pattern Recognition 34 (2001) 721-725; 2001 Pattern Recognition Society. Published by Elsevier Science Ltd.
Omar Elharrouss, Noor Almaadeed, Somaya Al-Maadeed, Younes Akbari; Image Inpainting: A Review; Neural Processing Letters (2020) 51:2007-2028; Published online: Dec. 6, 2019; https://doi.org/10.1007/s11063-019-10163-0.
Leon A. Gatys, Alexander S. Ecker, Matthias Bethge; Image Style Transfer Using Convolutional Neural Networks; Computer Vision Foundation; pp. 2414-2323.
Qiang Guo, Shanshan Gao, Xiaofeng Zhang, Yilong Yin, and Caiming Zhang; Patch-Based Image Inpainting via Two-Stage Low Rank Approximation; IEEE Transactions on Visualization and Computer Graphics, vol. 24, No. 6, pp. 2023-2036; Jun. 2018.

(56) References Cited

OTHER PUBLICATIONS

Richard O. Duda, Peter E. Hart; Use of the Hough Transformation to Detect Lines and Curves in Pictures; Association for Computing Machinery, Inc.; Communications of the ACM Jan. 1972 vol. 15 No. 1, pp. 11-15.
James Hays, Alexei A. Efros; Scene Completion Using Millions of Photographs; ACM Transactions on Graphics, vol. 26, No. 3, Article 4, pp. 8, Publication date: Jul. 2007.
Martin Heusel, Hubert Ramsauer, Thomas Unterthiner, Bernhard Nesseler, Sepp Hochreiter; GANs Trained by a Two Time-Scale Update Rule Converge to a Local Nash Equilibrium; pp. 12; 31st Conference on Neural Information Processing Systems (NIPS 2017), Long Beach, CA, USA.
Hongyu Liu, Bin Jiang, Yibing Song, Wei Huang, and Chao Yang; Rethinking Image Inpainting via a Mutual Encoder-Decoder with Feature Equalizations; Springer Nature Switzerland AG 2020, corrected publication 2020 A. Vedaldi et al. (Eds.): ECCV 2020, LNCS 12347, pp. 725-741, 2020.
Jia-Bin Huang, Sing Bing Kang, Narendra Ahuja, Johannes Kopf; Image Completion using Planar Structure Guidance; ACM Transactions on Graphics, vol. 33, No. 4, Article 129, pp. 10; Publication Date: Jul. 2014.
Kun Huang, Yifan Wang, Zihan Zhou, Tianjiao Ding, Shenghua Gao, and Yi Ma; Learning to ParseWireframes in Images of Man-Made Environments; Networks; Computer Vision Foundation; pp. 626-635.
Youngjoo Jo, Jongyoul Park; SC-FEGAN: Face Editing Generative Adversarial Network with User's Sketch and Color; Computer Vision Foundation; pp. 1745-1753.
Justin Johnson, Alexandre Alahi, Li Fei-Fei; Perceptual Losses for Real-Time Style Transfer and Super-Resolution; Department of Computer Science, Stanford University, Stanford, USA; Springer International Publishing AG 2016; B. Leibe et al. (Eds.): ECCV 2016, Part II, LNCS 9906, pp. 694-711, 2016; DOI: 10.1007/978-3-319-46475-643.
Avisek Lahiri, Arnav Kumar Jain, Sanskar Agrawal, Pabitra Mitra, Prabir Kumar Biswas; Prior Guided GAN Based Semantic Inpainting; Indian Institute of Technology Kharagpur, Microsoft; Computer Vision Foundation; pp. 13696-13705.
Cheng-Han Lee, Ziwei Liu, Lingyun Wu, Ping Luo; MaskGAN: Towards Diverse and Interactive Facial Image Manipulation; pp. 5549-5558.
Haodong Li, Weiqi Luo, Jiwu Huang; Localization of Diffusion-Based Inpainting in Digital Images; IEEE Transactions on Information Forensics and Security, vol. 12, No. 12, Dec. 2017, pp. 3050-3064.
Jingyuan Li, Fengxiang He, Lefei Zhang, Bo Du, Dacheng Tao; Progressive Reconstruction of Visual Structure for Image Inpainting; Computer Vision Foundation; pp. 5962-5971.
Jingyuan Li, Ning Wang, Lefei Zhang, Bo Du, Dacheng Tao; Recurrent Feature Reasoning for Image Inpainting; Computer Vision Foundation; pp. 7760-7768.
Liang Liao, Jing Xiao, Zheng Wang, Chia-Wen Lin, Shin'ichi Satoh; Guidance and Evaluation: Semantic-Aware Image Inpainting for Mixed Scenes; Springer Nature Switzerland AG 2020; A. Vedaldi et al. (Eds.): ECCV 2020, LNCS 12372, pp. 683-700, 2020.
Tsung-Yi Lin, Michael Maire, Serge Belongie, James Hays, Pietro Deva Ramanan, Piotr Dollar, and C. Lawrence Zitnick; Microsoft COCO: Common Objects in Context; D. Fleet et al. (Eds.): ECCV 2014, Part V, LNCS 8693, pp. 740-755, Springer International Publishing Switzerland 2014.
Guilin Liu, Fitsum A. Reda, Kevin J. Shih, Ting-Chun Wang, Andrew TAO, Bryan Catanzaro; Image Inpainting for Irregular Holes Using Partial Convolutions; NVIDIA Corporation; Computer Vision Foundation 2018; pp. 16.
Hongyu Liu, Bin Jiang, Yi Xiao, Chao Yang; Coherent Semantic Attention for Image Inpainting; Computer Vision Foundation; pp. 4170-4179.
Xiaohu Lu, Jian Yaoy, Kai Li, and Li Li; Cannylines: A Parameter-Free Line Segment Detector; IEEE Xplore ICIP 2015; pp. 507-511.
Takeru Miyato, Toshiki Kataoka, Masanori Koyama, Yuichi Yoshida; Spectral Normalization for Generative Adversarial Networks; Published as a conference paper at ICLR 2018; arXiv:1802.05957v1 [cs.LG] Feb. 16, 2018.
Kamyar Nazeri, Eric Ng, Tony Joseph, Faisal Z. Qureshi, and Mehran Ebrahimi; EdgeConnect: Structure Guided Image Inpainting using Edge Prediction; Computer Vision Foundation; pp. 10.
Yurui Ren, Xiaoming Yu, Ruonan Zhang, Thomas H. Li, Shan Liu, Ge Li; StructureFlow: Image Inpainting via Structure-aware Appearance Flow; Computer Vision Foundation; pp. 10.
Patsom Sangkloy, Jingwan Lu, Chen Fang, Fisher Yu, James Hays; Scribbler: Controlling Deep Image Synthesis with Sketch and Color; Computer Vision Foundation; pp. 5400-5409.
Shen Zhuoran, Zhang Mingyuan, Zhao Haiyu, Yi Shuai, Li Hongsheng; Efficient Attention: Attention with Linear Complexities; WACV 2021; Computer Vision Foundation; pp. 3531-3539.
Yuhang Song, Chao Yang, Yeji Shen, Peng Wang, Qin Huang, C.C. Jay Kuo; SPG-Net: Segmentation Prediction and Guidance Network for Image Inpainting; pp. 1-14; arXiv:1805.03356v4 [cs.CV] Aug. 6, 2018.
Vaswani et al.; Attention is all You Need; 31st Conference on Neural Information Processing Systems (NIPS 2017), Long Beach, CA, USA; pp. 11.
Rafael Grompone von Gioi Jérémie Jakubowicz, Jean-Michel Morel, and Gregory Randall; LSD: A Fast Line Segment Detector with a False Detection Control; IEEE Transactions on Pattern Analysis and Machine Intelligence, vol. 32, No. 4, Apr. 2010; pp. 722-732.
Ting-Chun Wang, Ming-Yu Liu, Jun-Yan Zhu, Andrew Tao, Jan Kautz, Bryan Catanzaro; High-Resolution Image Synthesis and Semantic Manipulation with Conditional GANs; Computer Vision Foundation; pp. 8798-8807.
Zhou Wang, Alan Conrad Bovik, Hamid Rahim Sheikh, Eero P. Simoncelli; Image Quality Assessment: From Error Visibility to Structural Similarity; IEEE Transactions on Image Processing, vol. 13, No. 4, Apr. 2004; pp. 600-612.
Wei Xiong, Jiahui Yu, Zhe Lin, Jimei Yang, Xin Lu, Connelly Barnes, Jiebo Luo; Foreground-aware Image Inpainting; Computer Vision Foundation; pp. 5840-5848.
Nan Xue, Tianfu Wu, Song Bai, Fudong Wang, Gui-Song Xia, Liangpei Zhang, Philip H.S. Torr; Holistically-Attracted Wireframe Parsing; Computer Vision Foundation 2020; pp. 2788-2797.
Jie Yang, Zhiquan Qi, Yong Shi; Learning to Incorporate Structure Knowledge for Image Inpainting; The Thirty-Fourth AAAI Conference on Artificial Intelligence (AAAI-20); (www.aaai.org); pp. 12605-12612.
Zili Yi Qiang, Tang Shekoofeh, Azizi Daesik, Jang Zhan Xu; Contextual Residual Aggregation for Ultra High-Resolution Image Inpainting; Computer Vision Foundation 2020; pp. 7508-7517.
Fisher Yu, Vladlen Koltun; Multi-Scale Context Aggregation by Dilated Convolutions; Published as a conference paper at ICLR 2016; arXiv:1511.07122v3 [cs.CV] Apr. 30, 2016; pp. 1-13.
Jiahui Yu, Zhe Lin, Jimei Yang, Xiaohui Shen, Xin Lu, Thomas S. Huang; Generative Image Inpainting with Contextual Attention; Computer Vision Foundation; pp. 5505-5514.
Jiahui Yu, Zhe Lin, Jimei Yang, Xiaohui Shen, Xin Lu, Thomas S. Huang; Free-Form Image Inpainting with Gated Convolution; Computer Vision Foundation; pp. 4471-4480.
Yanhong Zeng, Jianlong Fu, Hongyang Chao, Baining Guo; Learning Pyramid-Context Encoder Network for High-Quality Image Inpainting; Computer Vision Foundation; pp. 1486-1494.
Yu Zeng, Zhe Lin, Jimei Yang, Jianming Zhang, Eli Shechtman, Huchuan Lu; High-Resolution Image Inpainting with Iterative Confidence Feedback and Guided Upsampling; Springer Nature Switzerland AG 2020; A. Vedaldi et al. (Eds.): ECCV 2020, LNCS 12364, pp. 1-17, 2020.
Richard Zhang, Phillip Isola, Alexei A. Efros, Eli Shechtman, Oliver Wang; The Unreasonable Effectiveness of Deep Features as a Perceptual Metric; Computer Vision Foundation; pp. 586-595.
Richard Zhang, Jun-yan Zhu, Phillip Isola, Xinyang Geng, Angela S. Lin, Tianhe Yu, Alexei A. Efros; Real-Time User-Guided Image Colorization with Learned Deep Priors; ACM Transactions on Graphics, https://doi.org/http://dx.doi.org/10.1145/3072959.3073703.

(56) References Cited

OTHER PUBLICATIONS

Bolei Zhou, Agata Lapedriza, Aditya Khosla, Aude Oliva, Antonio Torralba; Places: A 10 Million Image Database for Scene Recognition; IEEE Transactions on Pattern Analysis and Machine Intelligence, vol. 40, No. 6, pp. 1452-1464; Jun. 2018.

Fichao Zhou, Haozhi Qi, Yi Ma; End-to-EndWireframe Parsing; Computer Vision Foundation; pp. 962-971.

Shunxin Xu, Dong Liu, Zhiwei Xiong; E2I: Generative Inpainting From Edge to Image; IEEE Transcations on Circuits and Systems for Video Technology, vol. 31, No. 4. pp. 1308-1322; Apr. 2021.

* cited by examiner

NETWORK AND SYSTEM FOR POSE AND SIZE ESTIMATION

RELATED APPLICATIONS

The present patent application claims priority of China patent application No. 202110266160.0 filed on Mar. 11, 2021. The entire content of the application is incorporated herein by reference.

TECHNICAL FIELD

This invention is related to a network for pose and size estimation, and more particularly, for a network of category-level 6D object pose and size estimation. This invention is also related to a system and a method thereof.

BACKGROUND

Estimating accurate 6D pose estimation plays a pivotal role in the tasks of augmented reality, scene understanding, and especially robotic applications such as grasping and manipulation. For example, FIG. 1 shows the comparisons between the texture/color and the geometry under the synthetic and real-world image domain (part i), as well as the implementation of DONet deployed in a physical Baxter robot (part ii).

Most prior arts focus on "instance-level" 6D object pose estimation, where the 6D pose of the target instance is recovered given exact 3D models. Given exact 3D models, many traditional tasks focus on feature or template matching. Although they can deal with many scenarios well, the performance will drop sharply when encountering textureless objects or heavy object occlusion. Recently, the method of directly regressing 6D pose from RGB images by CNN-based architectures has been investigated, e.g., PoseNet (Kendall et al., "A convolutional network for real-time 6-dof camera relocalization", *IEEE international conference on computer vision*, 2015), PoseCNN (Xiang et al., "A convolutional neural network for 6d object pose estimation in cluttered scenes", *arXiv preprint arXiv:1711.00199*, 2017). DenseFusion (Wang et al., "Densefusion: 6d object pose estimation by iterative dense fusion", *IEEE Conference on Computer Vision and Pattern Recognition*, 2019) introduces "densefusion" manner for better aggregating color and depth information from the RGB-D images. Another line of works regress the object coordinates or keypoints in a 2D image with kinds of methods, and then recover pose by Perspective-n-Point (Lepetit et al., "An accurate o (n) solution to the pnp problem", *International journal of computer vision*, 2009) algorithm. Instead of simply selecting the corners of the model's bounding box, PVNet (Peng, "Pixel-wise voting network for 6dof pose estimation", *IEEE Conference on Computer Vision and Pattern Recognition*, 2019) utilizes the farthest point sampling (FPS) algorithm to generate keypoints. They also propose a pixelwise voting network to deal with the heavy occlusion and truncated scenes. Heuristically, PVN3D (He et al., "A deep point-wise 3d keypoints voting network for 6dof pose estimation", *IEEE/CVF Conference on Computer Vision and Pattern Recognition*, 2020) expends key points voting from 2D to 3D space and then recovers the pose by the least-squares fitting. Enlightened by PVNet and PVN3D, our approach searches the potential center in a similar voting manner, available for a more general setting. Unfortunately, these methods have limited generalization to unseen instances of unknown 3D models.

In recent years, there is growing interest in category-level pose estimation approaches, vitally alleviating the premise on available exact 3D models. Sahin et al. ("Category-level 6d object pose recovery in depth images", *European Conference on Computer Vision*, 2018) first address the category-level 6D object pose estimation problem, by training a part-based random forest with 3D skeleton representations for pose recovery. Wang et al. ("Normalized object coordinate space for category-level 6d object pose and size estimation", *IEEE Conference on Computer Vision and Pattern Recognition*, 2019) propose a method to learn the pixel-wise correspondence, mapping foreground image pixels to 3D object coordinates in NOCS. Chen et al. ("Learning canonical shape space for category-level 6d object pose and size estimation", *IEEE/CVF Conference on Computer Vision and Pattern Recognition*, 2020) train a variational auto-encoder (VAE) to learn a pose-independent 3D shape representation for complete model reconstruction in CASS, which is subsequently contrasted with the pose-dependent features to regress pose and size. Tian et al. ("Shape prior deformation for categorical 6d object pose and size estimation", *arXiv preprint arXiv:2007.08454*, 2020) leverage mean latent embedding to reconstruct the categorical shape prior, and conduct the model deformation for coarse-to-fine shape reconstruction. This approach also learns correspondence for mapping the reconstructed model into NOCS coordinates. 6-PACK ("6-pack: Category-level 6d pose tracker with anchor-based keypoints", *IEEE International Conference on Robotics and Automation (ICRA)*, 2020) is the first category specific pose tracker to achieve real-time tracking given the initial pose.

The intra-category variations make category-level 6D object pose and size estimation extremely challenging. Particularly, to tackle such category-level object variations, most previous works learn the generalized function to map varieties of instances into a unified space, such as Normalized Object Coordinate Space (NOCS) (see also "Normalized object coordinate space for category-level 6d object pose and size estimation") and Canonical Shape Space (CASS) (see Chen et al., "Learning canonical shape space for category-level 6d object pose and size estimation", *IEEE/CVF Conference on Computer Vision and Pattern Recognition*, 2020). To achieve this, the method like NOCS. utilizes the features extracted from RGB information solely, while other works like CASS exploit the fused RGB-D features, by using "densefusion" manner which has been validated under the "instance-level" setting. However, experimental results of CASS indicate that the primary performance improvement solely relies on the features extracted from the color information, rather than the depth information. Hence, it remains unclear whether such a fusion manner is efficient enough to utilize the depth information under the "category-level" setting.

On the other hand, taking the mug under a certain perspective in FIG. 1 (part i) as an example, different textures cause visual diversity in color space while the shape preserves nearly the same. Intuitively, there should be fewer variations in geometry than that of textures, in term of the 6D object pose and size estimation. Thus it is essential to make the network fully explore the potential of geometry information, and be optimized under geometry-based search space.

The synthetic-real image domain gap is another important challenge in the concerned task. Typically, the gap between the synthetic and real data distributions is caused by multiple factors, like lighting conditions and material textures, etc (see also in "Normalized object coordinate space for category-level 6d object pose and size estimation"). This challenge intrinsically hinders the applications of 6D object pose and size estimation, because a large amount of available synthesized training examples cannot be effectively leveraged to new testing samples in the real image domain. Critically, as one can easily see that such a gap has a larger negative effect to color information of RGB channels than that of depth information in D channel, as illustrated in FIG. 1. Thus, to bridge the domain gap, it is essential to exploit more information from depth channel to improve the generalization ability of the model.

Since most objects are symmetrical or pseudo-symmetrical, the research on estimating object symmetry has been very topical recently. Wu et al. ("Unsupervised learning of probably symmetric deformable 3d objects from images in the wild", *IEEE/CVF Conference on Computer Vision and Pattern Recognition,* 2020) use latent symmetry properties to disentangle components obtained from a single image. In the field of 6D pose estimation, HybridPose (Song et al., "Hybridpose: 6d object pose estimation under hybrid representations", *IEEE/CVF Conference on Computer Vision and Pattern Recognition,* 2020) is the first work to leverage reflection symmetry information, which takes the symmetry correspondences as one of the intermediate representations mainly improving the performance of symmetry objects.

It's desired to extend 2D reflection symmetry-correspondence onto 3D point-wise paired points, to fully utilize the geometric constraint conditions which significantly improves the performance of 6D object pose and size inference.

In sum, there is a need to provide a new and different mechanism for category-level 6D object pose and size estimation.

SUMMARY

To this end, it is proposed a geometry-based approach for 6D object pose and size recovery, from a single depth image, without external pose-annotated real-world training data Specifically, the approach of this invention recovers the unified 3D Orientation-Consistent Presentation (3D-OCR) for learning implicit orientation alignment. And it infers potential lacked Geometry-constrained Reflection Symmetry (GeoReS) for further global shape understanding. Subsequently, the mirror-paired points that are a combined point set of the input points and the predicted symmetric points, are delivered to Mirror-paired Dimensional Estimation (MPDE) including the Mirror-Paired Dense Voting (MPDV) and size regression modules.

Concretely, given a depth observation, the approach of this invention implicitly learns to map visible surface points into the abstract 3D-OCR. As shown in FIG. 1 (part ii), the RGB-D sensor captures partial surface observation (a) due to opacity of objects. As for the category-specific instance, humans intuitively tend to associate the observable part with an abstract 3D representation of the category, implicitly align the target observation with the abstract one. Hence, we model such a process as decoupling the unified orientation expression, which aims to learn shape-invariant features for orientation characterization. As can be observed, the 3D-OCR (row b in FIG. 1) inherits the same orientation as the input partial observation (row a in FIG. 1), or we can assume that input partial observation and 3D-OCR are semantic aligned.

Meanwhile, it is to extend an extra branch for reasoning the potential mirror-paired points from the observable one depicted in row (c) of FIG. 1, which has been validated to encourage the performance in practical experiments. The observable and predicted symmetric points are grouped and re-centered, which implicitly provides a "coarse center" for ensuing fine-grained centripetal voting, as shown in row (d) of FIG. 1.

In one aspect of this invention, it is provided a network for category-level 6D pose and size estimation, including a 3D-OCR module for 3D Orientation-Consistent Representation, a GeoReS module for Geometry-constrained Reflection Symmetry, and a MPDE module for Mirror-Paired Dimensional Estimation;

wherein the 3D-OCR module and the GeoReS module are incorporated in parallel;

the 3D-OCR module receives a canonical template shape including canonical category-specific keypoints;

the GeoReS module receives an original input depth observation including pre-processed predicted category labels and potential masks of the target instances;

the MPDE module receives the output from the GeoReS module as well as the original input depth observation; and the network outputs the estimation results based on the output of the MPDE module, the output of the 3D-OCR module, as well as the canonical template shape.

Preferably, the original input depth observation is of category-known instance

Preferably, given camera intrinsic and segmented mask, the original input depth observation is back-projected from aligned RGB-D images. Then this back-projected partial observation is normalized.

Preferably, the canonical template shape is sampled by Farthest Point Sampling (FPS) algorithm for preserving the geometry of the object.

Preferably, the 3D-OCR module includes a first encoder and a first decoder.

Preferably, the GeoReS module includes a second encoder and a second decoder.

Preferably, the first and second encodes extract a first multiple latent feature and a second multiple latent feature.

Preferably, the first multiple latent feature and the second multiple latent feature are concatenated by a plurality of repetitions to generate per-point embedding before feeding into the first decoder and the second decoder.

Preferably, in the GeoReS module, the original input depth observation is reflectively paired with a corresponding reflective observation.

Preferably, the corresponding reflective observation implicitly decouples the pose from the original input depth observation by sending the second multiple latent feature into the second decoder for point-wise paired prediction.

Preferably, in the MPDE module, a relative complete object shape is obtained by grouping the output of the GeoReS module and the original input depth observation.

Preferably, the original input depth observation and the ground truth symmetric points are combined during training.

Preferably, the network learns to optimize the weighted vector per point, to generate the offset candidate set.

Preferably, the MPDE includes a Mirror-Paired Dense Voting (MPDV) sub-module and a size regression sub-module for learning dimensional information.

Preferably, the dimensional information including the centripetal distance and the object size.

Preferably, the network directly regresses the uniform scale after grouped mirror-paired points are obtained.

In another aspect of this invention, it is provided a system for category-level 6D pose and size estimation, including a 3D-OCR module for 3D Orientation-Consistent Representation, a GeoReS module for Geometry-constrained Reflection Symmetry, and a MPDE module for Mirror-Paired Dimensional Estimation;

wherein the 3D-OCR module and the GeoReS module are incorporated in parallel;

the 3D-OCR module receives a canonical template shape including canonical category-specific keypoints;

the GeoReS module receives an original input depth observation including pre-processed predicted category labels and potential masks of the target instances;

the MPDE module receives the output from the GeoReS module as well as the original input depth observation; and the network outputs the estimation results based on the output of the MPDE module, the output of the 3D-OCR module, as well as the canonical template shape.

In yet another aspect of this invention, it is provided a method for category-level 6D pose and size estimation, including a 3D-OCR step for 3D Orientation-Consistent Representation, a GeoReS step for Geometry-constrained Reflection Symmetry, and a MPDE step for Mirror-Paired Dimensional Estimation;

wherein the 3D-OCR step and the GeoReS step are in parallel;

in the 3D-OCR step, a canonical template shape including canonical category-specific keypoints is received as input;

in the GeoReS step, an original input depth observation including pre-processed predicted category labels and potential masks of the target instances is received as input;

in the MPDE step, the output from the GeoReS module and the original input depth observation are received as input;

the estimation results is output based on the output of the MPDE module, the output of the 3D-OCR module, as well as the canonical template shape.

In general, this invention at least has the advantages as follows:

1) a novel intermediate 3D-OCR is proposed in category level object orientation estimation, which implicitly learns semantic alignment with the observable point cloud for rotation recovery;

2) a novel GeoReS component is proposed to leverage the reflection symmetry assumption as auxiliary enhancement for orientation and dimensional estimation;

3) a new MPDE component is proposed for accurate object center and size estimation, and jointly training modules aforementioned further improves the performance;

4) the 6D object pose and size estimator of this invention achieves nearly real-time performance, running at round 10 Hz on a single NVIDIA RTX2070 GPU; and 5) the approaches of this invention outperforms the state of-the-art by using synthetic data only, with significant performance improvement (5° 2 cm mAP: 24.1% vs. 19.3%, and 5° 5 cm Accuracy: 49.1% vs. 33.3%), based on the results of extensive experiments conducted on category-level datasets.

BRIEF DESCRIPTION OF DRAWINGS

The foregoing summary, as well as the following detailed description, will be better understood when read in conjunction with the appended drawings. For the purpose of illustration, there is shown in the drawings certain embodiments of the present disclosure. It should be understood, however, that the invention is not limited to the precise arrangements and instrumentalities shown. The accompanying drawings, which are incorporated in and constitute a part of this specification, illustrate an implementation of systems and apparatuses consistent with the present invention and, together with the description, serve to explain advantages and principles consistent with the invention.

DETAILED DESCRIPTION

Figure 1:
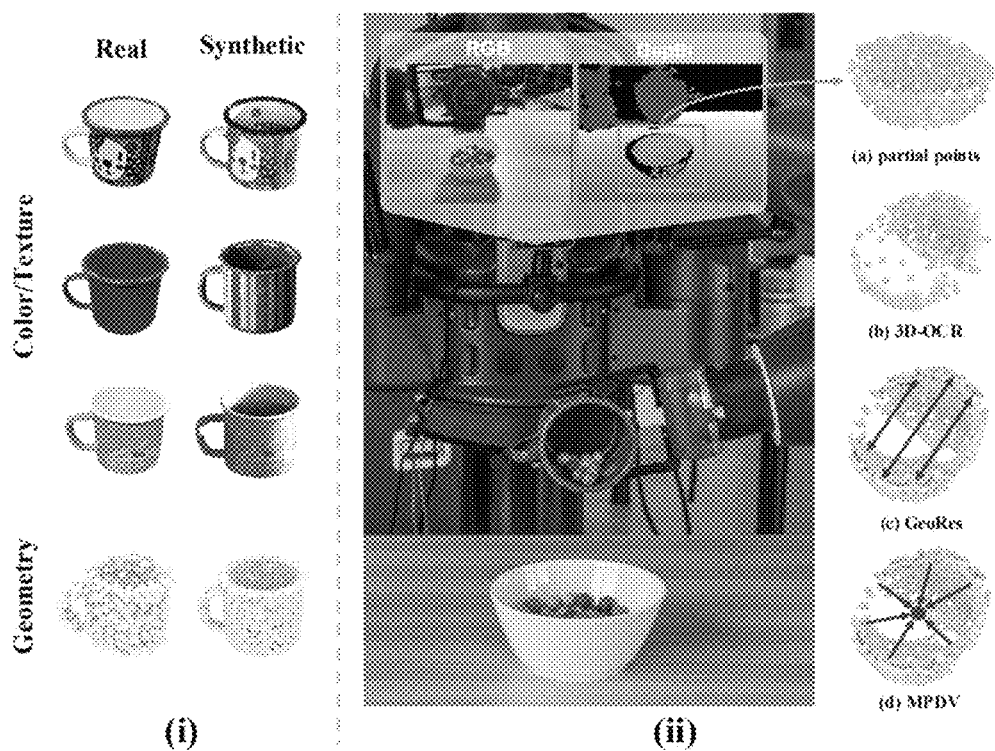
FIG. 1 illustratively shows the comparisons between the texture/color and the geometry under the synthetic and real-world image domain, as well as the implementation of the network of this invention which is deployed in a physical Baxter robot.

Before explaining at least one embodiment of the invention in detail, it is to be understood that the invention is not limited in its application to the details of construction and to the arrangements of the components set forth in the following description or illustrated in the drawings. The Figures and written description are provided to teach any person skilled in the art to make and use the inventions for which patent protection is sought. The invention is capable of other embodiments and of being practiced and carried out in various ways. Those skilled in the art will appreciate that not all features of a commercial embodiment are shown for the sake of clarity and understanding. Persons of skill in the art will also appreciate that the development of an actual commercial embodiment incorporating aspects of the present inventions will require numerous implementation—specific decisions to achieve the developer's ultimate goal for the commercial embodiment. While these efforts may be complex and time-consuming, these efforts nevertheless would be a routine undertaking for those of skill in the art having the benefit of this disclosure.

In addition, it is to be understood that the phraseology and terminology employed herein are for the purpose of description and should not be regarded as limiting. For example, the use of a singular term, such as, "a" is not intended as limiting of the number of items. Also the use of relational terms, such as but not limited to, "top," "bottom," "left," "right," "upper," "lower," "down," "up," "side," are used in the description for clarity in specific reference to the Figures and are not intended to limit the scope of the invention or the appended claims. Further, it should be understood that any one of the features of the invention may be used separately or in combination with other features. Other systems, methods, features, and advantages of the invention will be or become apparent to one with skill in the art upon examination of the Figures and the detailed description. It is intended that all such additional systems, methods, features, and advantages be included within this description, be within the scope of the present invention, and be protected by the accompanying claims.

Embodiments of the subject matter and the functional operations described in this specification optionally can be implemented in digital electronic circuitry, or in computer software, firmware, or hardware, including the structures disclosed in this specification and their structural equivalents, or in combinations of one or more of them. Embodiments of the subject matter described in this specification can, for example, be implemented as one or more computer program products, e.g., one or more modules of computer program instructions encoded on a computer readable medium for execution by, or to control the operation of, data processing apparatus.

The computer readable medium can be a machine readable tangible storage device, a machine readable tangible storage substrate, a tangible memory device, or a combination of one or more of them. The term "data processing apparatus" encompasses all apparatus, devices, and machines for processing data, including by way of example a programmable processor, a computer, or multiple processors or computers. The apparatus can include, in addition to hardware, code that creates an execution environment for the computer program in question, e.g., code that constitutes processor firmware, a protocol stack, a database management system, an operating system, or a combination of one or more of them. A computer program (also known as a program, software, software application, script, or code), can be written in any form of programming language, including compiled or interpreted languages, and it can be deployed in any form, including as a stand alone program or as a module, component, subroutine, or other unit suitable for use in a computing environment. A computer program does not necessarily correspond to a file in a file system. A program can be stored in a portion of a file that holds other programs or data (e.g., on or more scripts stored in a markup language document), in a single file dedicated to the program in question, or in multiple coordinated files (e.g., files that store one or more modules, sub programs, or portions of code). A computer program can be deployed to be executed on one computer or on multiple computers that are located at one site or distributed across multiple sites and interconnected by a communication network.

The processes and logic flows described in this specification can be performed by one or more programmable processors executing one or more computer programs to perform functions by operating on input data and generating output. The processes and logic flows can also be performed by, and apparatus can also be implemented as, special purpose logic circuitry, e.g., an FPGA (field programmable gate array) or an ASIC (application specific integrated circuit).

Processors suitable for the execution of a computer program include, by way of example, both general and special purpose microprocessors, and any one or more processors of any kind of digital computer. Generally, a processor will receive instructions and data from a read only memory or a random access memory or both. The essential elements of a computer are a processor for performing instructions and one or more memory devices for storing instructions and data. Generally, a computer will also include, or be operatively coupled to receive data from or transfer data to, or both, one or more mass storage devices for storing data, e.g., magnetic, magneto optical disks, or optical disks. However, a computer need not have such devices. Moreover, a computer can be embedded in another device, e.g., a mobile telephone, a personal digital assistant (PDA), a mobile audio player, a Global Positioning System (GPS) receiver, to name just a few. Computer readable media suitable for storing computer program instructions and data include all forms of nonvolatile memory, media, and memory devices, including by way of example semiconductor memory devices, e.g., EPROM, EEPROM, and flash memory devices; magnetic disks, e.g., internal hard disks or removable disks; magneto optical disks; and CD ROM and DVD ROM disks. The processor and the memory can be supplemented by, or incorporated in, special purpose logic circuitry.

To provide for interaction with a user, embodiments of the subject matter described in this specification can be implemented on a computer having a display device, e.g., a CRT (cathode ray tube) to LCD (liquid crystal display) monitor, for displaying information to the user and a keyboard and a pointing device, e.g., a mouse or a trackball, by which the user can provide input to the computer. Other kinds of devices can be used to provide for interaction with a user as well; for example, feedback provided to the user can be any form of sensory feedback, e.g., visual feedback, auditory feedback, or tactile feedback; and input from the user can be received in any from, including acoustic, speech, or tactile input.

Embodiments of the subject matter described in this specification can be implemented in a computing system that includes a back end component, e.g., as a data server, or that includes a middleware component, e.g., an application server, or that includes a front end component, e.g., a client computer having a graphical user interface or a Web browser through which a user can interact with an implementation of the subject matter described in this specification, or any combination of one or more such back end, middleware, or front end components. The components of the system can be interconnected by any form or medium of digital data communication, e.g., a communication network. Examples of communication networks include a local area network ("LAN") and a wide area network ("WAN"), e.g., the Internet.

The computing system can include clients and servers. A client and server are generally remote from each other and typically interact through a communication network. The relationship of client and server arises by virtue of computer programs running on the respective computers and having a client server relationship to each other.

In this invention it is to estimate the 6D object pose and size of a set of unseen instances with known categories, presented by a partial point cloud. We represent the 6D object pose as a rigid-body homogeneous transformation matrix $[R|t] \in SE(3)$, where rotation $R \in SO(3)$ and translation $t \in R3$. $SE(3)$ and $SO(3)$ indicate the Lie group of 3D rigid transformations and 3D rotations, individually. And the size of the object is formalized by scale factor $s \in R$.

We denote the original input depth observation of a category-known instance as $O_{ori}(R, t|c) \in R3 \times N$, where c is the category prior of the detected objects; N is the number of the valid back-projected points, and $(R; t)$ is the pose described in the camera frame. In order to be robust against the global scale, for all input $O_{ori}(R, t|c)$ with different dimension, we shift and scale them to the unit sphere as $O(R, t_n|c)$ in Eq. 1, $$\begin{cases} O(R, t_n \mid c) = \dfrac{O_{ori}(R, t \mid c) - C_0}{S_0} \\ C_0 = \dfrac{1}{N} \sum_{p_i \in O_{ori}} p_i \\ S_0 = \max_{p_i \in O_{ori}} \{\|p_i - C_0\|_2\} \end{cases} \quad (1)$$

where C0 is the centroid of the points $p_i \in O_{ori}(R, t|c)$, and S0 is the scale factor to transform the original points into the unit sphere. We denote $t_n = (t_x, t_y, t_z)$ as the point cloud's centre location after normalization.

Here Oori(R, t|c) denotes the original depth observations from category-known instances, while O(R, tn|c) represents the normalized one. Similarly, we use TK(R0, t0|c) to describe the canonical template shape of the category c represented by K keypoints, and TK($\hat{R}$, $\hat{t}\hat{t}$0|c) is the predicted 3D-OCR. O'(R, tn|c) indicates the corresponding reflective part with respect to O(R, tn|c), while G(R, tn|c) is the combined point set composed of O(R, tn|c) and O'(R, tn|c).

Figure 2:
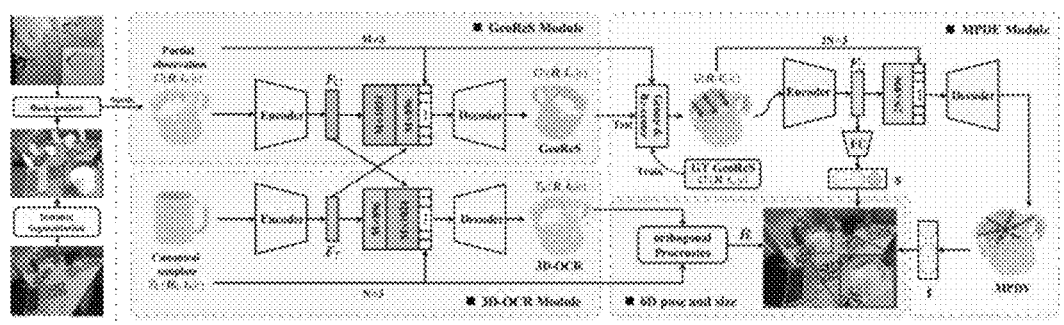
FIG. 2 illustrates an overview of the framework for category-level 6D pose and size estimation according to this invention.

FIG. 2 illustrates an overview of the network for category-level 6D pose and size estimation according to this invention. The pre-processing stage (left side) outputs the predicted category labels and potential masks of the target instances (mug as an example). The back-projected points from depth observation and the canonical category-specific keypoints are fed into the main network (right side). The network includes four output branches that generate the 3D-OCR, GeoReS, MPDV, and uniform scale. Particularly, the GT GeoReS is only used during training.

As illustrated in FIG. 2, the potential instance-wise pixels are segmented with an off-the-shelf approach like the Mask-RCNN (He et al., "Mask r-cnn", *IEEE international conference on computer vision*, 2017) under clutter scenes, and the partial point cloud is then back-projected from the aligned RGB-D images given the camera intrinsic and segmented mask. Consequently, the partial observation is fed into our main network for the following prediction.

The network of this invention includes three modules:
(1) 3D-OCR (3D Orientation-Consistent Representation),
(2) GeoReS (Geometry-constrained Reflection Symmetry), and
(3) MPDE (Mirror-Paired Dimensional Estimation).

We first formulate a two-branch network by incorporating the 3D-OCR module and the GeoReS module in parallel, where the symmetry reasoning inspires the pose discrimination. While the remaining module MPDE contains the MPDV and size regression sub-module for learning dimensional information, including the centripetal distance and the object size.

The detailed illustration of the three module are as follow.

First is the illustration of the 3D-OCR Module (3D Orientation-Consistent Representation). Given depth normalized observation O(R, tn|c), our goal is to standardize the shape-invariant rotation representation for each category-specific instance. That is to say, extract the representative orientation from the observation and map it onto the correspondent canonical template shape of the category c, inheriting the consistent orientation R. Concretely, our algorithm will first utilize a template shape T (R0, t0|c)∈Mc as canonical category-specific template shape, where R0 and t0 indicate canonical orientation and translation respectively; the category label c is predicted by Mask-RCNN in the pre-processing step. We denote the available category-specific model collections as $M_c = \{M_i^c\}_{i=1}^{N_c}$, where Nc is the number of models belonging to the category c. The intuition of this step comes from that instances across a specific category share similarity with template shape. Additionally, the template shape T (R0, t0|c) is sampled by Farthest Point Sampling (FPS) algorithm for preserving the geometry of the object, into a sparse K keypoints representations TK(R0, t0|c).

Overall, this module aims at learning a parametric mapping function fθ(•) to reconstruct the 3D-OCR, namely fθ(O(R, tn|c))→$\tau_K$($\hat{R}$,$\hat{t}$0|c), where θ is the optimized CNN parameters. That is to say, the generated representation $\tau_K$($\hat{R}$,$\hat{t}$0|c) implicitly characterizes the predicted orientation to be consistent with the input O(R, tn|c). One explanation is that the fθ(•) learns the semantic correspondence between the partial observation O(R, tn|c) and the 3D-OCR TK(R, t0|c), to maintain semantic alignment. Then the rotation recovery $\hat{R}$ is known as the orthogonal Procrustes problem of alignment for two ordered set of keypoints TK(R0, t0|c) and $\tau_K$($\hat{R}$,$\hat{t}_0$|c).

Our network uses PointNet-like structure as illustrated in FIG. 2. The normalized partial observation O(R, tn|c) and the category-specific canonical template representation TK(R0, t0|c) are fed into the network and the encoders aim to extract feature FO and FT, respectively. Specially, for better aggregating low-level and high-level feature, our network conducts the maxpooling of each K-dimensional vector derived from the last n layers and concatenates them as a multiple latent feature FO=f1⊙f2 . . . ⊙fn, where ⊙ denotes concatenation. The dimension of output vector fn after maxpooling is K. Then FO and FT are concatenated by N repetition to generate per-point embedding before feeding into the decoder, which aims to perform orientation-guided characterization under perspective context extracted from the partial observations O(R, tn|c).

Second is the illustration of the Module GeoReS (Geometry-constrained Reflection Symmetry). It is assumed that most of the objects are reflective or weakly reflective symmetry. Reasoning such symmetry properties of the objects further encourages 3D shape understanding, for better perspective context decomposing and dimensional information learning as discussed below.

Especially, we consider two kinds of symmetry on the objects.

One is reflection symmetry. As for the instances with absolute reflective symmetry from categories like mug and laptop, they are usually symmetric about a fixed vertical plane, which can be treated as the symmetry-axis constraint for reinforcing the pose recovery performance. Thus, given the observation O(R, tn|c), there exists corresponding O'(R, tn|c), to be reflectively paired with O(R, tn|c). O'(R, tn|c), which implicitly decouples the (R; tn) from the perspective-specific observation O(R, tn|c). We do so by sending the feature FO into the decoder for point-wise paired prediction.

The other is rotational symmetry. While the rotational symmetric instances like can and bowl are ambiguous around the symmetry-axis, resulting in the same appearance. It means that there exhibit infinite reflective planes passing through the symmetry-axis which hinders the network to get converged. One remedy to rotate the partial point O(R, tn|c) by 180° around its symmetry-axis in the object frame, to generate the paired points O'(R, tn|c). It also enables our network to reason the occluded part from the observable one, to obtain a more complete shape for subsequent dimensional estimation.

Given normalized depth observation O(R, tn|c), the GeoReS module learns a function hγ(•) to enforce that the predicted reflection-paired hγ(O(R, tn|c))=O'(R, tn|c), which implicitly decouples the (R; tn) from the perspective-specific observation O(R, tn|c). We do so by sending the feature FO into the decoder for point-wise paired prediction.

Last is the introduction of MPDE (Mirror-Paired Dimensional Estimation). Built upon the GeoReS module, we further obtain a relative complete object shape beneficial to center localization and size regression, by grouping the output O'($\hat{R}$,$\hat{t}_n$|c), of the GeoReS branch and input O(R, tn|c). Notably, we combine the observation O(R, tn|c) and ground truth symmetric points O'(R, tn|c) during training, namely the grouped points Gori(R, tn|c)=O(R, tn|c)+OR, tn|c).

Such a combination step generates a relatively complete object shape for coarse center localization. We define the recentered grouped points G(R, t'n|c) as Eq. 2.

$$\begin{cases} \mathcal{G}(R, t'_n \mid c) = \mathcal{G}_{ori}(R, t \mid c) - C'_0 \\ C'_0 = \frac{1}{2N} \sum_{q_i \in O_{ori}} q_i \end{cases} \quad (2)$$

where C'0 is the re-computed centroid of the completed points G(R, tn|c).

According to a preferable embodiment of this invention, the Center localization (MPDV) is conducted as follows. Here the instance's center is treated as a specific keypoint, and all the points in G(R, t'n|c) generate distance weighted vectors directed to the potential center densely. Thus, the network learns to optimize the weighted vector per point, to generate the offset candidate set $D=\{\hat{d}_i\}_{i=1}^{2N}$, directing from the surface points q'i to the instance center $t'_n=(t'_x,t'_y,t'_z)$. Specially, we apply simple average mean to select the final voted center for reducing the computational expense in our practical experiments. In total, the re-centered points set G(R, t'n|c) locates coarsely the object center, and the following pointwise dense voting searches for fine-grained potential translation offsets in constrained 3D space. Finally, the object center t̂ of the original observation Oori(R, t|c) that described in the camera frame is computed as follows, $$\begin{cases} \hat{t} = (\hat{t}'_n + C'_0) \cdot S_0 + C_0 \\ \hat{t}'_n = \frac{1}{2N} \sum_{q'_i \in q'_i, d_i \in D} (q'_i + \hat{d}_i) \end{cases} \quad (3)$$

According to a preferable embodiment of this invention, the size estimation is conducted as follows. Obtained the grouped mirror-paired points G, the network directly regresses the uniform scale sn. Then the actual size s is recovered by the effect of the given scale factor S0, i.e. s=S0·sn. Compared to regressing only with partial points set O(R, tn|c), the combined points G(R, tn|c) provides a more complete shape prior for more accurate size estimation as illustrated below.

As to the Keypoints reconstruction loss, we aim to learn the intra-class shape-invariant unified orientation representation from the observable point cloud. Given the groundtruth 3D-OCR $\tau_K^{gt}=\{p_i^o\}_{i=1}^{K}$ which consists of K ordered keypoints during the training procedure, the network learns to reconstruct the underlying unified representation $\tau_K=\{\hat{p}_i^o\}_{i=1}^{K}$, the reconstruction loss is defined as:

$$\mathcal{L}_{rec} = \frac{1}{K} \sum_{i=1}^{K} \|p_i^a - \hat{p}_i^a\|_1 \quad (4)$$

Nevertheless, the Lrec encounters ambiguities in dealing with symmetric instances, which deviates the model from converging. Hence, we generate a candidate ground truth set as follows, $$\mathcal{L}_{rec}^{sym} = \min_{C \in \mathcal{C}} \frac{1}{M} \sum_{i=1}^{M} \|p_i^a - \hat{p}_i^a\|_1 \quad (5)$$

where C={Ci}Mi=1 is a set of candidate symmetry transformations. Set C covers M discrete rotational symmetries along symmetry axis, M=12 in our case.

As to the symmetry prediction loss, the GeoReS module learns to predict potential mirror-paired points, to reason the pointwise reflective points based on the input observation points. We optimize the objective by the following loss:

$$\mathcal{L}_{ref} = \frac{1}{N} \sum_{i=1}^{N} \|p_i^r - \hat{p}_i^r\|_1 \quad (6)$$

where N is the input points count, p"i and p||"i are the ground truth and predicted reflective points, respectively. It is assumed that the network parameterizes the 3D shape prior and auxiliarly disentangles pose information during inferring the lacked reflection pair O'(R̂,tn|c).

As to the centripetal distance-weighted vector loss, the network of this invention learns the distance-weighted vector di pointing to the potential center from the visible points q'i, or translation offset between them. The learning of di is supervised by minimizing the predicted bias Δdi in x, y, and z directions:

$$\mathcal{L}_{cen} = \frac{1}{N} \sum_{i=1}^{N} (\Delta d_{i|x} + \Delta d_{i|y} + \Delta d_{i|z}), \quad (7)$$

$$\Delta d_i = \|d_i - \hat{d}_i\|_1$$

where N denotes the total number of observable surface points, while Δdi|x, Δdi|y, and Δdi|z are the three vector components of Δdi.

As to the size loss, the partial observable points implicitly determine the scale dimension information which is relevant to its 3D shape. For better size recovery, we take the advantage of the predicted output from the GeoReS module, to construct an explicit but simpler shape completion as discussed above. We tend to regress the size directly from the dimension-related global feature FG. We supervise the size regression with l1 loss:

$$\mathcal{L}_{size} = \left\|\frac{\hat{s}}{s} - 1\right\|_1 \quad (8)$$

where s represents the ground truth uniform scale and ŝ is the predicted one of the normalized points O(R, t'n|c). Associate multi-task loss with multi-branch network architecture, the overall multi-task learning objective is a weighted sum of all four loss terms aforementioned:

$$L=\lambda_1 \cdot L_{rec} + \lambda_2 \cdot L_{ref} + \lambda_3 \cdot L_{cen} + \lambda_4 \cdot L_{size} \quad (9)$$

where λ1, λ2, λ3 and λ4 are the weights for each branch task. The practical experiment demonstrates that the associated joint learning progressively improves the final performance (see infra.)

Experiments

In the experiment, we use the recently introduced NOCS dataset which contains six table-scale object categories including bottle, bowl, can, camera, laptop, and mug. For real-world performance evaluation, we test our method on the NOCS-REAL275 dataset which contains 2.75K real scene images in simulated real-world clutter manner. Since our network is trained with synthetic data only, all the instances in the NOCS-REAL275 are treated unseen to our model. We utilize the 3D models from the ShapeNetCore (see Chang et al, "Shapenet: An information-rich 3d model repository", *arXiv preprint arXiv:*1512.03012, 2015) for learning the 3D-OCR and GeoReS.

As to the evaluation metrics, we compute the average precision of 3D Intersection-Over-Union (IoU) at 25%, 50% and 75% for object detection. And the average precision under m ncm is calculated for evaluating 6D pose recovery. Here we choose thresholds under diverse levels of difficulty at 5° 2 cm, 5° 5 cm, 10° 2 cm, and 10° 5 cm. As for the symmetric instances, only the error between the symmetry-axis is considered. The mug is treated as symmetric objects under the specific perspective where the handle is occluded.

Our network is exclusively trained with synthetic depth images without any real pose-annotated images. To be specific, we pick 1085 object models covering six categories from ShapNetCore and utilize the Blender software to render depth images under random perspectives. Specially, we render 60 different views for each instance and the back-projected partial points are disorderly sampled into 1024 points. The model is trained for 200 epochs with a batch size of 32. We initially set the learning rate as 0.0001 and decrease it by a factor of 0.75 for every 20 epochs. And the weights in Eq. 9 are set as $\lambda_1=\lambda_2=\lambda_3=\lambda_4=1.0$, individually.

The competitors are introduced for the experiments. All these methods, includes ours, take RGB-D images as input and output 6D object poses and size.

1) NOCS: The first category-level 6D object pose and size estimation method that uses pixel-wise prediction and depth map for pose and size recovery.
2) CASS: The method trains a VAE for canonical complete model reconstruction. It directly regresses the pose and size upon the comparison between the pose-independent and pose-dependent features.
3) 6-PACK: the state-of-the-art pose tracker which achieves high pose accuracy for category-specific instances.
4) DeformNet: the state-of-the-art pose estimation method that leverages the deformation upon categorical shape priors to estimate the 6D object pose and size.
5) Ours: We train a depth-based model with multiple output branches for 6 categories (i.e., one estimator for multicategory) as NOCS and DeformNet for fair comparison.

We compare our approach with the RGB-D pose estimation methods DeformNet and CASS and the pose tracking method 6-PACK on the NOCE-REAL275 dataset. For fair comparison, we use the instance segmentation results provided by DeformNet and report the mean average precision (mAP) under different 3Dk and m ° ncm metrics.

Quantitative results are summarized in Tab. 1. Here we report the evaluation on mAP, accuracy on the NOCS-REAL275 datasets. And we also compare the model size for different methods. (↑): high better, (↓): lower better.

Trained upon the synthetic 3D models, all the test instances of the six categories in the NOCS-REAL275 dataset are unseen ones to our network. The baseline methods require real images during training, there are three instances per category of the test set appeared at the train set, resulting in only another three unseen instances per category toward their networks. Even in such comparison, we achieve a mAP of 63.7% for 3DIoU at 75% and an mAP of 34.8% for 6D pose at 5° 5 cm metric. In comparison with DeformNet, our approach outperforms it by a margin of 10.5% and 13.4% in terms of the 3D75 and 5° 5 cm metric, respectively.

Figure 3:
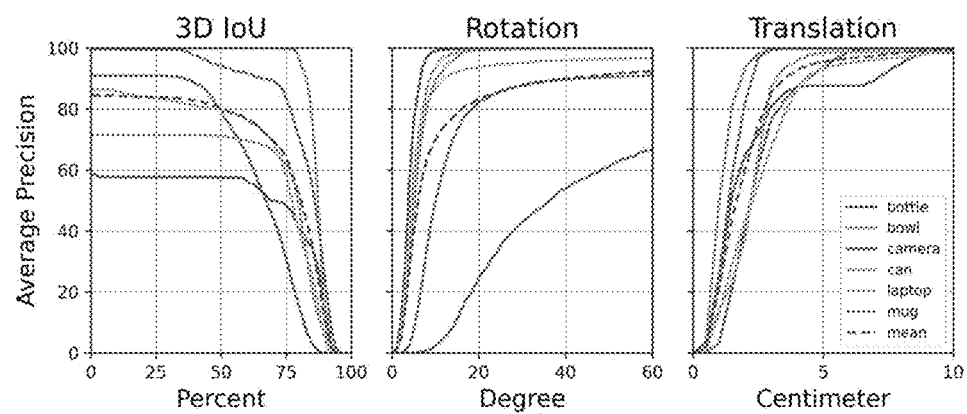
FIG. 3 illustratively shows the average precision (AP) results vs. different thresholds on 3D IoU, rotation error, and translation error on the NOCS-REAL275 dataset.

FIG. 3 illustratively shows the average precision (AP) results vs. different thresholds on 3D IoU, rotation error, and translation error on the NOCS-REAL275 dataset. It is observed from FIG. 3 that our approach achieves better rotation recovery especially for mug (reflection symmetry) which is one of the most difficult categories to estimate. As for the categories like bottle, bowl and can (rotational symmetry), our method easily achieve high rotation accuracy (<10- percentage) above 90%. On the other hand, in comparison with other methods as in Tab. 1, our depthbased method has a more lightweight model, which is more feasible for mobile devices. Empirically, 6-PACK is a poses tracking method with higher pose accuracy versus the pose estimation method, but it trains the model which is capable of tracking novel category-specific object instances. We also report the mean accuracy (<5° 5 cm percentage) which still outperforms it by 15.8% under such comparison.

Figure 4:
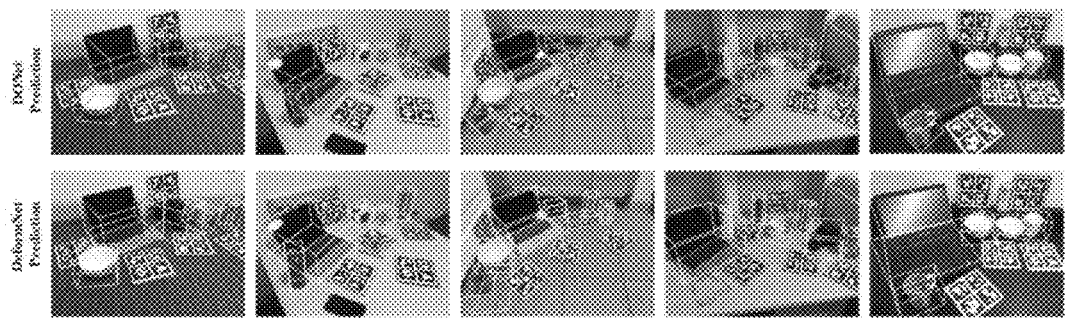
FIG. 4 illustratively shows the qualitative comparisons between the network of this invention according to this application and DeformNet for pose and size estimation.

FIG. 4 illustratively shows the qualitative comparisons between our DONet (top row) and DeformNet (bottom row) for pose and size estimation. We visualize the estimated 6D pose and size as the tight oriented bounding box around the target instances. With the predicted poses and sizes of the target instances, the bounding boxes are transformed into the camera coordinate and then projected onto a 2D image frame with given camera intrinsic. As can be observed, our depth-based estimator achieves more accurate results. Specially, we gain a superior performance on the reflective symmetric instances like mug on the benefit of the symmetry reasoning.

We conduct some ablation study to verify the effectiveness of the key components in our model. Since our framework integrates several components including the 3D-OCR, GeoReS and MPDE, we explore the influence of the modules under different configurations. Table 2 shows the summarized results of ablation studies on different configurations for 6D object pose and size estimation on the NOCS-REAL275 dataset (see below). Please note that FPS K means that applied K keypoints representation of the 3D-OCR, generated by the FPS algorithm.

TABLE 1

| Dataset | Method | mAP(↑) | | | | | | Accuracy (↑) | Model size(↓) |
| --- | --- | --- | --- | --- | --- | --- | --- | --- | --- |
| | | $3D_{50}$ | $3D_{75}$ | 5°2 cm | 5°5 cm | 10°2 cm | 10°5 cm | 5°5 cm | (Mbit) |
| REAL275 | NOCS | 78.0 | 30.1 | 7.2 | 10.0 | 13.8 | 25.2 | — | 211.0* |
| | CASS | 77.7 | — | — | 23.5 | — | 58.0 | — | — |
| | 6-PACK | — | — | — | — | — | — | 33.3 | 81.5 |
| | DeformNet | 77.3 | 53.2 | 19.3 | 21.4 | 43.2 | 54.1 | 30.4 | 73.3 |
| | Ours | 80.4 | 63.7 | 24.1 | 34.8 | 45.3 | 67.4 | 49.1 | 18.5 |

TABLE 2

| Row | 3D-OCR | GeoReS | Method MPDE (w/o rc.) | MPDE | FPS |
|---|---|---|---|---|---|
| 1 | √ | | | | 36 |
| 2 | √ | √ | | | 36 |
| 3 | √ | √ | √ | | 36 |
| 4 | √ | √ | | √ | 36 |
| 5 | √ | √ | | √ | 16 |
| 6 | √ | √ | | √ | 128 |

| Row | $3D_{50}$ | $3D_{75}$ | 5°2 cm | mAP (↑) 5°5 cm | 10°2 cm | 10°5 cm | Accuracy (↑) 5°5 cm |
|---|---|---|---|---|---|---|---|
| 1 | 81.1 | 55.3 | 15.9 | 23.6 | 34.9 | 59.1 | 39.4 |
| 2 | 81.2 | 60.1 | 17.8 | 27.7 | 38.8 | 63.3 | 44.1 |
| 3 | 80.6 | 62.6 | 20.5 | 31.7 | 39.8 | 65.3 | 46.4 |
| 4 | 80.4 | 63.7 | 24.1 | 34.8 | 45.3 | 67.4 | 49.1 |
| 5 | 79.6 | 62.9 | 22.8 | 33.0 | 46.1 | 67.6 | 47.9 |
| 6 | 79.5 | 59.5 | 21.5 | 32.1 | 43.7 | 66.3 | 47.5 |

The base is a naive network architecture, where the network directly outputs the 3D-OCR, dense centripetal vectors, and uniform scale based on the partial points O(R, t'n|c). As can be observed from the results in the row 1, the naive network generates comparable mAP result at 5° 5 cm metric contrasted to the competitors DeformNet and NOCS. Nevertheless, directly learning the dense centripetal vectors and size from partial observation results in poor performance under the strict metrics of 5 ° 2 cm and 3D75.

The GeoReS module is sequentially added, by extending an additional branch for reflection symmetry prediction. At the stage, the output of this branch is not utilized for subsequent dimensional estimation. The comparison results between the rows 1 and 2 illustrate the auxiliary enhancement of the symmetry recovery.

The GeoReS module is then sequentially added. However, it is argued that the combined points G(R, t'n|c) provide a more complete shape for center and size estimation, compared to that of the partial one. We firstly remove the beforehand recenter (rc.) operation to validate the improvement performance upon a more complete shape. Seen from the row 3, it achieves better mAP and accuracy results on 6D object pose and size estimation. Then it is obtained a full model by recovering the recenter operation, the network learns to optimize under the implicitly provided "coarser center". By Comparing the results of the rows 3 and 4, it indicates the necessity of the recenter operation beneficial to center localization and size estimation, resulting in further improvement of 1.1% at 3D75 and 3.6% at 5° 2 cm, respectively.

In addition, We also explore the performance under varied K keypoints representations TK(R0, t0|c) that sampled by FPS algorithm, by keeping the remaining experiment configurations as that in the row 4. It is observed from the last three rows that 36 keypoints is a good trade-off for our network to learn. And the choice of 128 keypoints degrades the performance due to the larger output space, while the 16 keypoints one is too sparse to represent the geometry structure, which also results in negative influence to the final performance.

Furthermore, we also deploy our model for inferring 6D object pose and size to execute manipulation tasks on a real Baxter robot which is a dual-arm collaborative robot with parallel grippers, mounted with a Real Sense D435 Camera on the base. In practical experiments, the estimator is implemented on the platform with a NVIDIA RTX2070 GPU and an Intel Core i7-9700K CPU, and it estimates the poses and sizes at around 10 Hz. To be specific, we qualitatively test the accuracy of 6D object pose and size estimation in additional clutter multi-objects scenes using bowl, mug, bottle and laptop.

Figure 5:
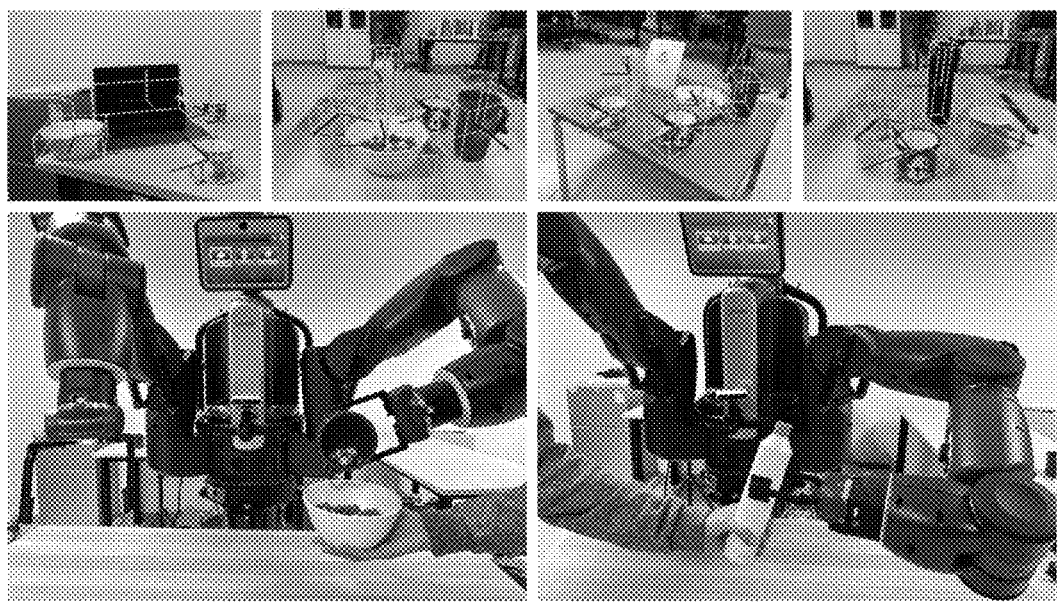
FIG. 5 illustratively shows the estimated results given by the network of this invention in various real clutter environments.

FIG. 5 illustratively shows the estimated results given by our DONet in various real clutter environments. Built upon the implementation of that, we also perform the interaction tasks on a physical Baxter robot. As can be seen in the top row of FIG. 5, our algorithm generates accurate estimation since the objects are visually located within the predicted bounding boxes and axis aligned. Our results indicate the generalization capability of our algorithm in the real-world scenes using only available synthetic data, freed from manual pose-annotations. Additionally, we choose 3 unseen instances from known categories (bowl, mug and bottle) for the human-robot interaction tasks. As shown in bottom row of FIG. 5, we randomly move the bowl, while the robot follows it and execute pour action at the appropriate time. We also perform the "delivery" interaction task with the robot to validate the real-time performance of our estimator.

It will be appreciated by those skilled in the art that changes could be made to the embodiments described above without departing from the broad inventive concept thereof. It is understood, therefore, that the invention disclosed herein is not limited to the particular embodiments disclosed, but it is intended to cover modifications within the spirit and scope of the present invention as defined by the appended claims.

The invention claimed is:

1. A network for category-level 6D pose and size estimation, including a 3D-OCR module for 3D Orientation-Consistent Representation, a GeoReS module for Geometry-constrained Reflection Symmetry, and a MPDE module for Mirror-Paired Dimensional Estimation, wherein:
   the 3D-OCR module and the GeoReS module are incorporated in parallel;
   the 3D-OCR module receives a canonical template shape including canonical category-specific keypoints;
   the GeoReS module receives an original input depth observation including pre-processed predicted category labels and potential masks of the target instances;
   the MPDE module receives the output from the GeoReS module as well as the original input depth observation; and
   the network outputs the estimation results based on the output of the MPDE module, the output of the 3D-OCR module, as well as the canonical template shape.

2. The network of claim 1, wherein the original input depth observation is of category-known instance.

3. The network of claim 1, wherein, the canonical template shape is sampled by Farthest Point Sampling (FPS) algorithm for preserving the geometry of the object.

4. The network of claim 1, wherein the 3D-OCR module includes a first encoder and a first decoder, and the GeoReS module includes a second encoder and a second decoder.

5. The network of claim 4, wherein the first and second encoders extract a first multiple latent feature and a second multiple latent feature, respectively.

6. The network of claim 5, wherein the first multiple latent feature and the second multiple latent feature are concatenated by a plurality of repetitions to generate per-point embedding before feeding into the first decoder and the second decoder.

7. The network of claim 6, wherein in the GeoReS module, the original input depth observation is reflectively paired with a corresponding reflective observation.

8. The network of claim 7, wherein the corresponding reflective observation implicitly decouples the pose from the original input depth observation by sending the second multiple latent feature into the second decoder for point-wise paired prediction.

9. The network of claim 1, wherein in the MPDE module, a relative complete object shape is obtained by grouping the output of the GeoReS module and the original input depth observation.

10. The network of claim 1, wherein the original input depth observation and ground truth symmetric points are combined during training.

11. The network of claim 1, wherein the MPDE includes a Mirror-Paired Dense Voting (MPDV) sub-module and a size regression sub-module for learning dimensional information.

12. The network of claim 11, wherein the dimensional information includes the centripetal distance and the object size.

13. The network of claim 11, wherein the network directly regresses an uniform scale after grouped mirror-paired points are obtained.

14. A system for category-level 6D pose and size estimation, including a 3D-OCR module for 3D Orientation-Consistent Representation, a GeoReS module for Geometry-constrained Reflection Symmetry, and a MPDE module for Mirror-Paired Dimensional Estimation, wherein:
the 3D-OCR module and the GeoReS module are incorporated in parallel;
the 3D-OCR module receives a canonical template shape including canonical category-specific keypoints;
the GeoReS module receives an original input depth observation including pre-processed predicted category labels and potential masks of the target instances;
the MPDE module receives the output from the GeoReS module as well as the original input depth observation; and
the network outputs the estimation results based on the output of the MPDE module, the output of the 3D-OCR module, as well as the canonical template shape.

15. A method for category-level 6D pose and size estimation, including a 3D-OCR step for 3D Orientation-Consistent Representation, a GeoReS step for Geometry-constrained Reflection Symmetry, and a MPDE step for Mirror-Paired Dimensional Estimation, wherein:
the 3D-OCR step and the GeoReS step are in parallel;
in the 3D-OCR step, a canonical template shape including canonical category-specific keypoints is received as input;
in the GeoReS step, an original input depth observation including pre-processed predicted category labels and potential masks of the target instances is received as input;
in the MPDE step, the output from the GeoReS module and the original input depth observation are received as input; and
the estimation results is output based on the output of the MPDE module, the output of the 3D-OCR module, as well as the canonical template shape.

* * * * *